US012585266B2

(12) United States Patent
Kim

(10) Patent No.: US 12,585,266 B2
(45) Date of Patent: Mar. 24, 2026

(54) AUTONOMOUS VEHICLE, CONTROL SYSTEM FOR REMOTELY CONTROLLING THE VEHICLE, AND CONTROL METHOD THEREOF

(71) Applicants: Hyundai Motor Company, Seoul (KR); Kia Corporation, Seoul (KR)

(72) Inventor: Dong Hyuk Kim, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 275 days.

(21) Appl. No.: 17/986,671

(22) Filed: Nov. 14, 2022

(65) Prior Publication Data

US 2023/0324903 A1 Oct. 12, 2023

(30) Foreign Application Priority Data

Apr. 8, 2022 (KR) ........................ 10-2022-0044129

(51) Int. Cl.
*G05D 1/00* (2024.01)
*B60W 50/14* (2020.01)
*B60W 60/00* (2020.01)

(52) U.S. Cl.
CPC ........... *G05D 1/0016* (2013.01); *B60W 50/14* (2013.01); *B60W 60/001* (2020.02);
(Continued)

(58) Field of Classification Search
CPC .. G05D 1/0016; B60W 60/001; B60W 50/14; B60W 2556/45; B60W 2050/143;
(Continued)

(56) References Cited

U.S. PATENT DOCUMENTS

2014/0303847 A1* 10/2014 Lavoie ............... B62D 15/0275
701/41
2015/0367886 A1* 12/2015 Lavoie ................... B62D 13/06
701/41
(Continued)

FOREIGN PATENT DOCUMENTS

DE 102017126878 A1 * 7/2018 ............... B62D 1/28
KR 101869340 B1 * 6/2018 ............. G05D 1/021
(Continued)

OTHER PUBLICATIONS

Na, Xiaoxiang, David J Cole, and Gang Li. "Two Nash-Equilibrium-Based Steering Control Models for Representing a Driver's Interaction with Vehicle Automated Steering." Vehicle system dynamics 60.7 (2022): 2255-2289. Web. (Year: 2022).*
(Continued)

*Primary Examiner* — Matthias S Weisfeld
*Assistant Examiner* — Keith A von Volkenburg
(74) *Attorney, Agent, or Firm* — Banner & Witcoff, Ltd.

(57) ABSTRACT

The present disclosure relates to an autonomous vehicle, a control system for remotely controlling the same, and a method thereof. An exemplary embodiment of the present disclosure provides a control system including: a steering configured to be controlled by a user for steering control of an autonomous vehicle; and a processor configured to receive, from the autonomous vehicle, a remote control request, and an indication of a current steering angle of the autonomous vehicle, and synchronize, based on the indication, a steering angle of the autonomous vehicle with a steering angle of the steering.

20 Claims, 9 Drawing Sheets a < th1

Match steering angle of control manager with steering angle of vehicle

(52) U.S. Cl.
CPC ... *B60W 2050/143* (2013.01); *B60W 2510/20* (2013.01); *B60W 2510/202* (2013.01); *B60W 2520/10* (2013.01); *B60W 2556/45* (2020.02); *B60W 2710/207* (2013.01); *B60W 2720/106* (2013.01)

(58) Field of Classification Search
CPC ....... B60W 2510/20; B60W 2510/202; B60W 2520/10; B60W 2710/207; B60W 2720/106
USPC ............................................................. 701/2
See application file for complete search history.

(56) References Cited

U.S. PATENT DOCUMENTS

| | | | |
|---|---|---|---|
| 2016/0031482 A1* | 2/2016 | Lavoie | B60W 30/18036 |
| | | | 701/41 |
| 2018/0113450 A1* | 4/2018 | Sherony | B60W 30/18163 |
| 2018/0297470 A1* | 10/2018 | Kim | G08G 1/166 |
| 2018/0326994 A1* | 11/2018 | Sakai | G05D 1/0061 |
| 2020/0192394 A1 | 6/2020 | Hammond et al. | |
| 2020/0293034 A1* | 9/2020 | Shibata | G01M 17/007 |
| 2020/0294401 A1* | 9/2020 | Kerecsen | G08G 1/205 |
| 2020/0409360 A1* | 12/2020 | Hwang | B60W 50/0205 |
| 2021/0221434 A1* | 7/2021 | Liu | B60W 60/0015 |
| 2021/0240191 A1* | 8/2021 | Cesafsky | G06N 3/006 |
| 2021/0331701 A1* | 10/2021 | Hur | H04W 4/44 |
| 2021/0354559 A1* | 11/2021 | Kim | B60W 40/08 |
| 2021/0387643 A1* | 12/2021 | Hari | B60W 30/095 |
| 2024/0017763 A1* | 1/2024 | Li | B62D 5/043 |

FOREIGN PATENT DOCUMENTS

| | | | | |
|---|---|---|---|---|
| WO | WO-2018159315 A1 * | 9/2018 | ............ | G07C 5/008 |
| WO | WO-2019113172 A1 * | 6/2019 | ............ | B60W 30/09 |

OTHER PUBLICATIONS

Buzunov, N V, G O Kotiev, and V A Gorelov. "Implementation of the Interaction of the Steering Wheel Loader Control System of the Remote-Controlled Wheeled Vehicle Operator Interface with a Real-Time Simulation Model." IOP conference series. Materials Science and Engineering 534.1 (2019). (Year: 2019).*

Qi, Jiahui, and Yaohua Wu. "Trajectory Tracking Control for Double-Steering Automated Guided Vehicle Based on Model Predictive Control." Journal of physics. Conference series 1449.1 (2020): 12107-. Web. (Year: 2020).*

Ryoo, Young-Jae, Jinkwan Kim KinamLee, and Yongjun Lee. "Automatic Steering Control System with Manned and Unmanned Mode for Automated Driving Electric Vehicle." International Journal on Human Machine Interaction (IJHMI) 1.12 (2014): 72-80. (Year: 2014).*

* cited by examiner

201

202

203 a < th1

Match steering
angle of control
manager with
steering angle
of vehicle a ≥ th1

Gradually match
steering angle of
control manager
and steering
angle of vehicle
to 0 degrees

0°

Steering torque
characteristic
Maximum steering angle

Steering
torque characteristic
depending on vehicle type
information in steering
characteristic DB,
Steering angle
setting of control
manager based on maximum
steering angle Notification by
displaying steering angle:    472°           One time 12°

Steering color
change notification:

AUTONOMOUS VEHICLE, CONTROL SYSTEM FOR REMOTELY CONTROLLING THE VEHICLE, AND CONTROL METHOD THEREOF

CROSS-REFERENCE TO RELATED APPLICATION

This application claims priority to and the benefit of Korean Patent Application No. 10-2022-0044129, filed in the Korean Intellectual Property Office on Apr. 8, 2022, the entire contents of which are incorporated herein by reference.

BACKGROUND

(a) Field

The present disclosure relates to an autonomous vehicle, a control system for remotely controlling the same, and a method thereof, and more particularly, to a technique for performing steering control by using a steering characteristic for each vehicle during remote control of an autonomous vehicle.

(b) Description of the Related Art

As vehicle electronics technology becomes more advanced, an interest in an autonomous vehicle that drives to a destination by recognizing a driving environment of the vehicle itself without manipulation of a driver is growing more and more.

An autonomous vehicle refers to a vehicle capable of operating by itself with little or no manipulation of a driver or an occupant.

While the vehicle is driving in an autonomous driving mode, there may be a situation in which it is impossible to follow a driving path to the destination normally although there is no abnormality in a function of the vehicle. As such, when a situation where it is impossible to follow a path occurs during autonomous driving, it is often difficult to follow the driving path, such as when the driver directly intervenes in control of the vehicle or when the driver's intervention is difficult, the vehicle stops.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure an autonomous vehicle, a control system for remotely controlling the same, and a method thereof, capable of performing steering control by synchronizing a steering angle of the autonomous vehicle with a steering angle of a control system using a steering characteristic of each vehicle when remotely controlling the autonomous vehicle, to prevent an accident caused by mismatching of the steering angles, thereby improving marketability of the autonomous vehicle.

The technical objects of the present disclosure are not limited to the objects mentioned above, and other technical objects not mentioned may be clearly understood by those skilled in the art from the description of the claims.

A control system may include: a steering input device configured to be controlled by a user for steering control of an autonomous vehicle; and a processor configured to receive, from the autonomous vehicle, a remote control request comprising an indication of a current steering angle of the autonomous vehicle, and synchronize, based on the indication, a steering angle of the autonomous vehicle with a steering angle of the steering input device.

The control system may further include a storage configured to store steering characteristic information including a steering torque characteristic for each vehicle type of one or more vehicle types, and a maximum steering angle for each vehicle type of the one or more vehicle types.

The processor may be further configured to apply a steering torque characteristic and a maximum steering angle corresponding to a vehicle type of the autonomous vehicle to steering setting of the steering input device based on the stored steering characteristic information.

The processor may synchronize the steering angle of the autonomous vehicle with the steering angle of the steering input device by matching the steering angle of the steering input device with the current steering angle of the autonomous vehicle in response to the current steering angle of the autonomous vehicle being less than a predetermined reference value.

The processor may be further configured to, in response to the current steering angle of the autonomous vehicle being greater than or equal to a predetermined reference value, set the steering angle of the steering input device to 0 degrees, and transmit a command signal to the autonomous vehicle to set the steering angle of the autonomous vehicle to 0 degrees.

The processor may be further configured to set, for the steering input device, the steering torque characteristic and the maximum steering angle corresponding to the vehicle type of the autonomous vehicle, transmit a remote control command to the autonomous vehicle for steering control of the autonomous vehicle, and determine whether a steering angle of the remote control command is greater than or equal to a predetermined reference value.

The processor may be further configured to continue to perform remote control of the autonomous vehicle in response to the steering angle of the autonomous vehicle for remote control being less than the predetermined reference value.

The processor may be further configured to, in response to the steering angle of the autonomous vehicle for remote control being greater than or equal to a predetermined reference value, change a color of a portion of the steering.

The control system may further include a display configured to display at least one of the steering angle of the steering, a number of rotations of the steering, or a rotating direction of the steering.

the processor may be further configured to, in response to the steering angle of the autonomous vehicle for remote control being greater than or equal to a predetermined reference value, output a warning sound at a time the autonomous vehicle starts.

The processor is further configured to, in response to the steering angle of the autonomous vehicle for remote control being greater than or equal to a predetermined reference value, request an acceleration limit of the autonomous vehicle starts.

The steering may include a light-emitting diode (LED) capable of color change.

An autonomous vehicle may include: a communication device configured to communicate with a control system; and a processor configured to request the control system to perform remote control of the autonomous vehicle; receive, from the control system, a steering angle control command comprising an indication of a steering angle of the control system; and control a steering angle of the autonomous vehicle to synchronize the steering angle of the autonomous vehicle with the steering angle of the control system.

The processor may be further configured to perform steering control of the autonomous vehicle based on the steering angle control command, in response to the steering angle of the control system being less than a predetermined reference value and the autonomous vehicle being in a driving state.

The processor may be further configured to limit acceleration of the autonomous vehicle in response to the steering angle of the control system being greater than or equal to the predetermined reference value at a time the autonomous vehicle starts from a stopped state.

The processor may be further configured to, in response to the steering angle of the control system being greater than or equal to the predetermined reference value and the autonomous vehicle being in a stopped state, control the autonomous vehicle to start at a vehicle speed that is less than a predetermined reference value regardless of an acceleration command received from the control system.

The processor may be further configured to transmit, to the control system via the communication device, a current steering angle of the autonomous vehicle, and a request to perform the remote control.

A method may include: receiving, by a processor, a remote control request from an autonomous vehicle; receiving an indication of a current steering angle of the autonomous vehicle; and synchronizing, by the processor and based on the indication, a steering angle of the autonomous vehicle with a steering angle of a control system.

The method may further include applying, by the processor, a steering torque characteristic and a maximum steering angle, corresponding to a vehicle type of the autonomous vehicle, to steering setting of the control system based on previously stored steering characteristic information for one or more vehicle types.

The synchronizing may include: matching, by the processor, the steering angle of the control system with the current steering angle of the autonomous vehicle in response to the current steering angle of the autonomous vehicle being less than a predetermined reference value; and in response to the current steering angle of the autonomous vehicle being greater than or equal to the predetermined reference value: setting, by the processor, the steering angle of the control system to 0 degrees; and transmitting a command signal to the autonomous vehicle to set the steering angle of the autonomous vehicle to 0 degrees.

According to the present technique, it may be possible to perform steering control by synchronizing a steering angle of the autonomous vehicle with a steering angle of a control system using a steering characteristic of each vehicle when remotely controlling the autonomous vehicle, to prevent an accident caused by mismatching of the steering angles, thereby improving performance and marketability of the autonomous vehicle.

Furthermore, various effects that can be directly or indirectly identified through this document may be provided.

DETAILED DESCRIPTION OF THE EMBODIMENTS

Figure 1:
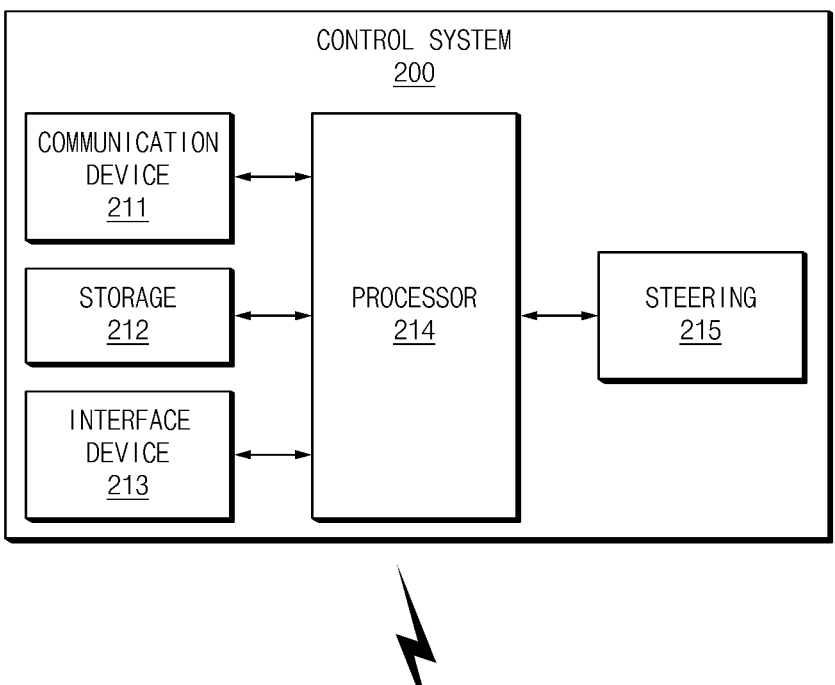
FIG. 1 illustrates a block diagram showing a configuration of an example remote control system for an autonomous apparatus.
Figure 1:
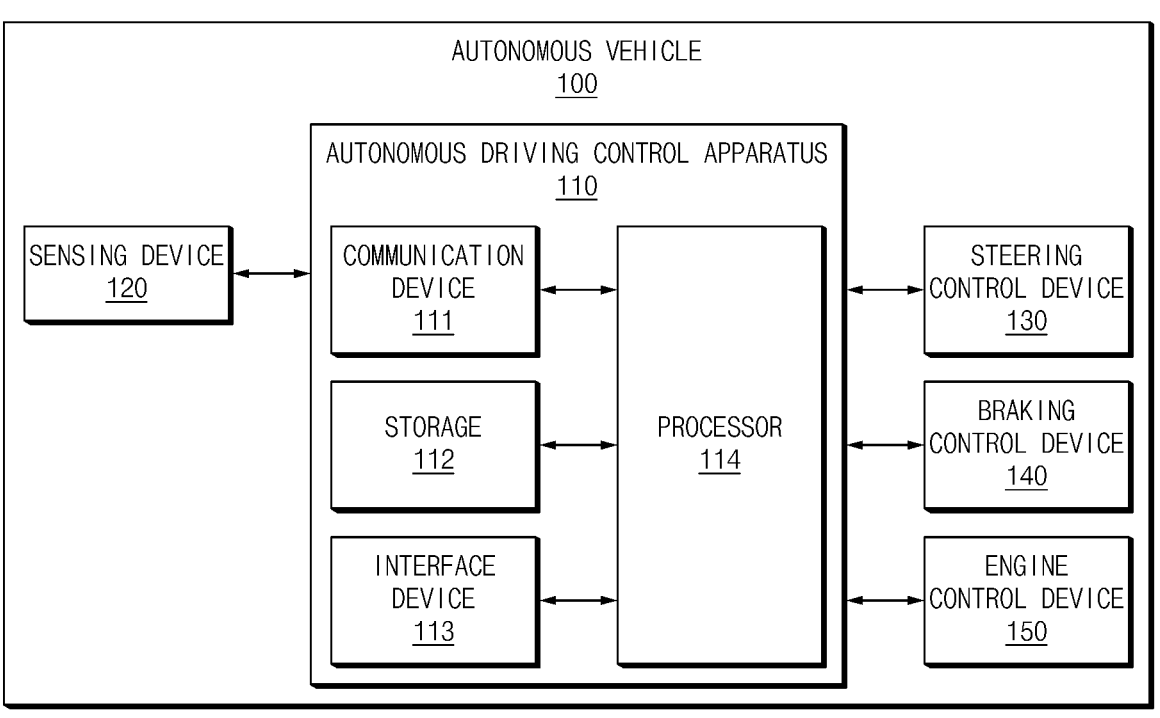

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

In order to perform remote steering control on an autonomous vehicle, it may be necessary to synchronize a steering angle of the autonomous vehicle that initially receives remote control with a steering angle of a control system that commands the remote control. In the instant case, steering of the control system and steering of the vehicle may be out of synchronization, so abrupt steering control may appear, and thus when the autonomous vehicle is remotely controlled, a technique that reflects a steering torque characteristic for each vehicle and synchronizes the steering of the autonomous vehicle and the steering of the control system is disclosed.

Hereinafter, various exemplary embodiments of the present disclosure will be described in detail with reference to FIG. 1 to FIG. 8.

FIG. 1 illustrates a block diagram showing a configuration of an example remote control system for an autonomous apparatus.

Referring to FIG. 1, the remote control system for an autonomous vehicle may include an autonomous vehicle 100 and a control system 200, and remote control may be performed through communication between the autonomous vehicle 100 and the control system 200.

The autonomous vehicle 100 may include an autonomous driving control apparatus 110, a sensing device 120, a steering control device 130, a braking control device 140, and an engine control device 150.

The autonomous driving control apparatus 110 may be implemented inside the vehicle. In the instant case, the autonomous driving control apparatus 110 may be integrally formed with internal control units of the vehicle, or may be implemented as a separate device to be connected to control units of the vehicle by a separate connector.

In a situation (e.g., a situation in which autonomous driving is not possible) where remote control of the autonomous vehicle is required, the autonomous driving control apparatus 110 may request the control system 200 to perform remote control.

The autonomous driving control apparatus 110 may transmit a current steering angle of the autonomous vehicle 100, vehicle position information (e.g., vehicle coordinates), vehicle surrounding information (e.g., obstacle information), and/or a vehicle path (e.g., a path from a departure point to a destination, etc.) when requesting the control system 200 to perform the remote control.

The autonomous driving control apparatus 110 may control the steering angle of the autonomous vehicle 100 depending on a steering angle control command received from the control system 200 in order to synchronize the steering angle of the steering for remote control of the control system 200 with the steering angle of the autonomous vehicle 100.

The autonomous driving control apparatus 110 may receive a remote control command from the control system 200. The remote control command may include a control command for enabling the autonomous vehicle 100 to reach a target point based on a precision map, etc., and may include, e.g., a steering control command, an acceleration control command, a deceleration control command, etc.

Referring to FIG. 1, the autonomous driving control apparatus 110 may include a communication device 111, a storage 112, an interface device 113, and a processor 114.

The communication device 111 may be a hardware device implemented with various electronic circuits to transmit and receive signals through a wireless or wired connection, and may transmit and receive information based on in-vehicle devices and in-vehicle network communication technologies. As an example, the in-vehicle network communication technologies may include controller area network (CAN) communication, local interconnect network (LIN) communication, flex-ray communication, Ethernet communication, and the like.

Furthermore, the communication device 111 may perform communication by using a server, infrastructure, or third vehicles outside the vehicle, and the like through a wireless Internet technology or short range communication technology. Herein, the wireless Internet technology may include wireless LAN (WLAN), wireless broadband (Wibro), Wi-Fi, world Interoperability for microwave access (Wimax), Fourth Generation Long-Term Evolution (4G LTE), Fifth Generation New Radio (5G NR), Ethernet communication, etc. Furthermore, short-range communication technique may include Bluetooth, ZigBee, ultra wideband (UWB), radio frequency identification (RFID), infrared data association (IrDA), and the like. For example, the communication device 111 may perform wireless communication with the control system 200, may transmit vehicle steering angle information, vehicle position information (e.g., vehicle coordinates), vehicle's surrounding information (e.g., obstacle information), a remote control request, a vehicle path, etc. to the control system 200, and may receive a remote control command or the like from the control system 200. The communication device 111 may further include a separate communication device (such as a modem) for communicating with the control system 200.

The storage 112 may store sensing results of the sensing device 120, information received from the control system 200, data and/or algorithms required for the processor 114 to operate, and the like.

As an example, the storage 112 may store vehicle surrounding information (image data captured through a camera), a vehicle path (driving path from origin to destination), a remote control command received from the control system 200, and the like.

The storage 112 may include at least one type of storage medium from among memory types such as a flash memory, a hard disk, a micro memory, a memory card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input interface for receiving a control command from a user and an output device for outputting an operation state of the autonomous driving control apparatus 110 and results thereof. Herein, the input interface may include a key button, and may further include a mouse, a keyboard, a touch screen, a microphone, a joystick, a jog shuttle, a stylus pen, and the like. Furthermore, the input interface may further include a soft key implemented on the display.

The output device may include a display, and may further include a voice output device such as a speaker. In the instant case, if a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

As an example, the interface device 113 may be implemented as a heads-up display (HUD), a cluster, an audio video navigation (AVN), a human machine interface (HM), a user setting menu (USM), or the like.

For example, the interface device 113 may display the corrected path received from the control system 200, the vehicle path generated by the vehicle, and the like. The interface device 113 may receive information from a driver, and for this purpose, a mouse, a keyboard, a touch screen, and a microphone may be provided.

The processor 114 may be electrically connected to the communication device 111, the storage 112, the interface device 113, and the like, may electrically control each component, and may be an electrical circuit that executes software commands, thereby performing various data processing and calculations described herein.

The processor 114 may process a signal transferred between components of the autonomous driving control apparatus 110, and may perform overall control such that each of the components can perform its function normally.

The processor 114 may be implemented in the form of hardware, software, or a combination of hardware and software. For example, the processor 114 may be implemented as a microprocessor, and it may be, e.g., an electronic control unit (ECU), a micro controller unit (MCU), or other subcontroller(s) mounted in the vehicle.

The processor 114 may request the control system 200 to perform remote control when the remote control is required during autonomous driving. In the instant case, if driving on a corresponding path is difficult impossible due to an obstacle or the like on the vehicle path for autonomous driving, the processor 114 may determine that the autonomous driving is difficult or impossible and remote control is required.

The processor 114 may control the steering angle of the autonomous vehicle 100 depending on a steering angle control command received from the control system 200 in order to synchronize the steering angle of the steering for remote control of the control system 200 and the steering angle of the autonomous vehicle 100.

If the steering angle by the steering angle control command is less than a predetermined reference (e.g., threshold) value and the autonomous vehicle is driving, the processor 114 may perform steering control of the vehicle 100 depending on the steering angle control command. The predetermined reference value may be preset by an experimental (e.g., an optimal value determined through experimentation) value, and may be, e.g., 20 degrees.

If the steering angle depending on the steering angle control command is equal to or greater than the predetermined reference value and the vehicle is stopped, when the autonomous vehicle 100 starts, the processor 114 may limit an amount of speed increase (e.g., an amount of acceleration) of the autonomous vehicle 100 so as not to start abruptly.

If he steering angle depending on the steering angle control command is greater than or equal to the predetermined reference value and the vehicle is stopped, when the autonomous vehicle 100 starts, the processor 114 may control the vehicle to start slowly (e.g., gradually) at a vehicle speed that is less than a predetermined reference value regardless of an acceleration command received from the control system 200.

The sensing device 120 may include one or more sensors that sense an obstacle (e.g., a leading vehicle or a trailing vehicle) positioned around the vehicle, and measure a distance with the obstacle, a relative speed thereof, and/or steering thereof. The sensing device 120 may include a plurality of sensors to sense an external object of the vehicle, to obtain information related to a position of the external object, a speed of the external object, a moving direction of the external object, and/or a type of the external object (e.g., vehicles, pedestrians, bicycles, motorcycles, etc.). To this end, the sensing device 120 may include an ultrasonic sensor, a radar, a camera, a laser scanner, and/or a corner radar, a lidar, an acceleration sensor, a yaw rate sensor, a torque measurement sensor, a wheel speed sensor, a steering angle sensor, etc. Furthermore, the sensing device 120 may include an indoor camera, an ultrasonic wave sensor, etc. to detect the movement of an object in the vehicle. The processor 114 may detect a situation such as when an occupant leaves an object (e.g., a phone, a key, sunglasses, etc.) inside a vehicle after alighting the vehicle.

The steering control device 130 may be configured to control a steering angle of the autonomous vehicle 100, and may include a steering wheel, an actuator interlocked with the steering wheel, and/or a controller controlling the actuator.

The braking control device 140 may be configured to control braking of the autonomous vehicle 100, and may include a controller that controls a brake thereof.

The engine control device 150 may be configured to control engine driving of the autonomous vehicle 100, and may include a controller that controls a speed of the vehicle 100.

The control system 200 may receive the steering angle of the autonomous vehicle 100 together with a remote control request from the autonomous vehicle 100, and may synchronize the steering angle of the autonomous vehicle 100 and a steering angle of a steering 215 for remote control of the autonomous vehicle 100. Furthermore, the control system 200 may reflect a steering characteristic of the autonomous vehicle 100 to a steering setting of the steering 215 based on steering characteristic information for each vehicle type stored in advance in the storage 212. In the instant case, the steering characteristic may include a maximum steering angle of steering, a steering torque characteristic, and the like. The maximum steering angle of steering is a maximum angle at which the steering can be rotated, and may vary depending on a vehicle type. The steering torque characteristic, which is a steering force, may include a speed characteristic at which the steering rotates.

The control system 200 may include a communication device 211, a storage 212, an interface device 213, a processor 214, and the steering 215. The control system may be a remote control system capable of controlling an autonomous vehicle 100 remotely.

The communication device 211 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

Furthermore, the communication device 211 may perform communication by using a server, infrastructure, or third vehicles outside the vehicle, and the like through a wireless Internet technology or short range communication technology. Herein, the wireless Internet technology may include wireless LAN (WLAN), wireless broadband (Wibro), Wi-Fi, world Interoperability for microwave access (Wimax), Fourth Generation Long-Term Evolution (4G LTE), Fifth Generation New Radio (5G NR), etc. Furthermore, short-range communication technique may include Bluetooth, ZigBee, ultra wideband (UWB), radio frequency identification (RFID), infrared data association (IrDA), and the like. For example, the communication device 211 may perform wireless communication with the autonomous vehicle 100, may receive a remote control request and current steering angle information of a vehicle from the autonomous vehicle 100, and may transmit a remote control command for steering control to the autonomous vehicle 100.

The storage 212 may store information received from the autonomous vehicle 100, and data and/or algorithm required for the processor 214 to operate, and the like. As an example, the storage 212 may store vehicle's surrounding information and vehicle information (e.g., a vehicle steering angle)

received from the autonomous vehicle 100. Particularly, the storage 212 stores database of steering characteristic information including a steering torque characteristic for each vehicle type and a maximum steering angle for each vehicle type.

The storage 212 may include at least one typo of storage medium from among memory types such as a flash memory, a hard disk, a micro memory, a memory card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input interface capable of receiving a control command from an operator and an output device for outputting an operation state of the control system 200 and results thereof. Herein, the input interface may include a key button, and may further include a mouse, a keyboard, a touch screen, a microphone, a joystick, a jog shuttle, a stylus pen, a virtual accelerator pedal, a virtual brake pedal, a virtual steering, and the like. Furthermore, the input interface may further include a soft key implemented on the display. For example, the interface device 213 may display map information in which a vehicle path, vehicle surrounding information, a current position of the autonomous vehicle 100, surrounding object information, etc. received from the autonomous vehicle 100 are marked. For example, the interface device 213 may include all communication terminals such as a personal computer (PC), a notebook computer, a smartphone, a tablet PC, a data pad, a personal digital assistant (PDA), and a wearable device.

The output device may include a display, and may further include a voice output device such as a speaker. In the instant case, when a touch sensor formed of a touch film, a touch sheet, or a touch pad is provided on the display, the display may operate as a touch screen, and may be implemented in a form in which an input device and an output device are integrated. As an example, the output device may include a small LCD touch screen, any other electrical device that is operable to display information, and the like. In the instant case, the display may include at least one of a liquid crystal display (LCD), a thin film transistor liquid crystal display (TFT LCD), an organic light emitting diode display (OLED display), a flexible display, a field emission display (FED), or a 3D display or any combination thereof.

As an example, the interface device 213 may display at least one of a steering angle of the steering 215, a number of rotations of the steering, or a rotating direction of the steering or any combination thereof.

The processor 214 may be electrically connected to the communication device 211, the storage 212, the interface device 213, and the like, may electrically control each component, and may be an electrical circuit that executes software commands, thereby performing various data processing and calculations described below.

The processor 214 may process a signal transferred between components of the control system 200, and may perform overall control such that each of the components can perform its function normally. The processor 214 may be implemented in the form of hardware, software, or a combination of hardware and software, or may be implemented as a microprocessor.

When receiving a remote control request and a vehicle path from the autonomous vehicle 100, the processor 214 may synchronize a steering angle of the autonomous vehicle

100 and a steering angle of the steering depending on a magnitude of a current steering angle of the autonomous vehicle 100.

Furthermore, the processor 214 may apply a steering torque characteristic and a maximum steering angle corresponding to the vehicle type of the autonomous vehicle 100 to steering setting of the steering by using steering characteristic information.

When a current steering angle of the autonomous vehicle 100 is smaller than a predetermined reference value, the processor 214 may match the steering angle of the steering with the current steering angle of the autonomous vehicle 100.

On the other hand, if the current steering angle of the autonomous vehicle 100 is greater than or equal to the predetermined reference value, the processor 214 may set a steering angle of the steering 215 to 0 degrees, and may transmit a command signal to the autonomous vehicle 100 to set a steering angle of the autonomous vehicle 100 to 0 degrees.

The processor 214 may set the steering torque characteristic and the maximum steering angle corresponding to the vehicle type of the autonomous vehicle 100 to the steering, and may transmit a remote control command to the autonomous vehicle 100 for steering control of the autonomous vehicle 100.

It may be determined whether a steering angle for remote control of the autonomous vehicle 100 of the remote control command is greater than or equal to a predetermined reference value.

If the steering angle for remote control of the autonomous vehicle 100 is less than a predetermined reference value, the processor 214 may continue to perform remote control of the autonomous vehicle 100.

If the steering angle for remote control of the autonomous vehicle 100 is greater than or equal to the predetermined reference value, the processor 214 may change a color of the steering or may output a warning sound when the autonomous vehicle 100 starts.

If the steering angle for remote control of the autonomous vehicle 100 is greater than or equal to the predetermined reference value, the processor 214 may request an acceleration limit of the autonomous vehicle 100.

The steering 215 (also referred to as a steering input device), which may be a device for changing a rotational axis direction of front wheels to change a traveling direction of the autonomous vehicle 100, may be an operating mechanism that includes a steering handle, a steering column, and the like, and may transmit a steering force of a control manager 201 to a gear device. The steering 215 may include a light-emitting diode (LED) for displaying a color, etc., and may display the color of the steering 215 differently depending on a change in a steering angle so that the control manager (e.g., a remote driver, a user, etc.) intuitively recognizes the change in the steering angle of the steering 215.

Figure 2:
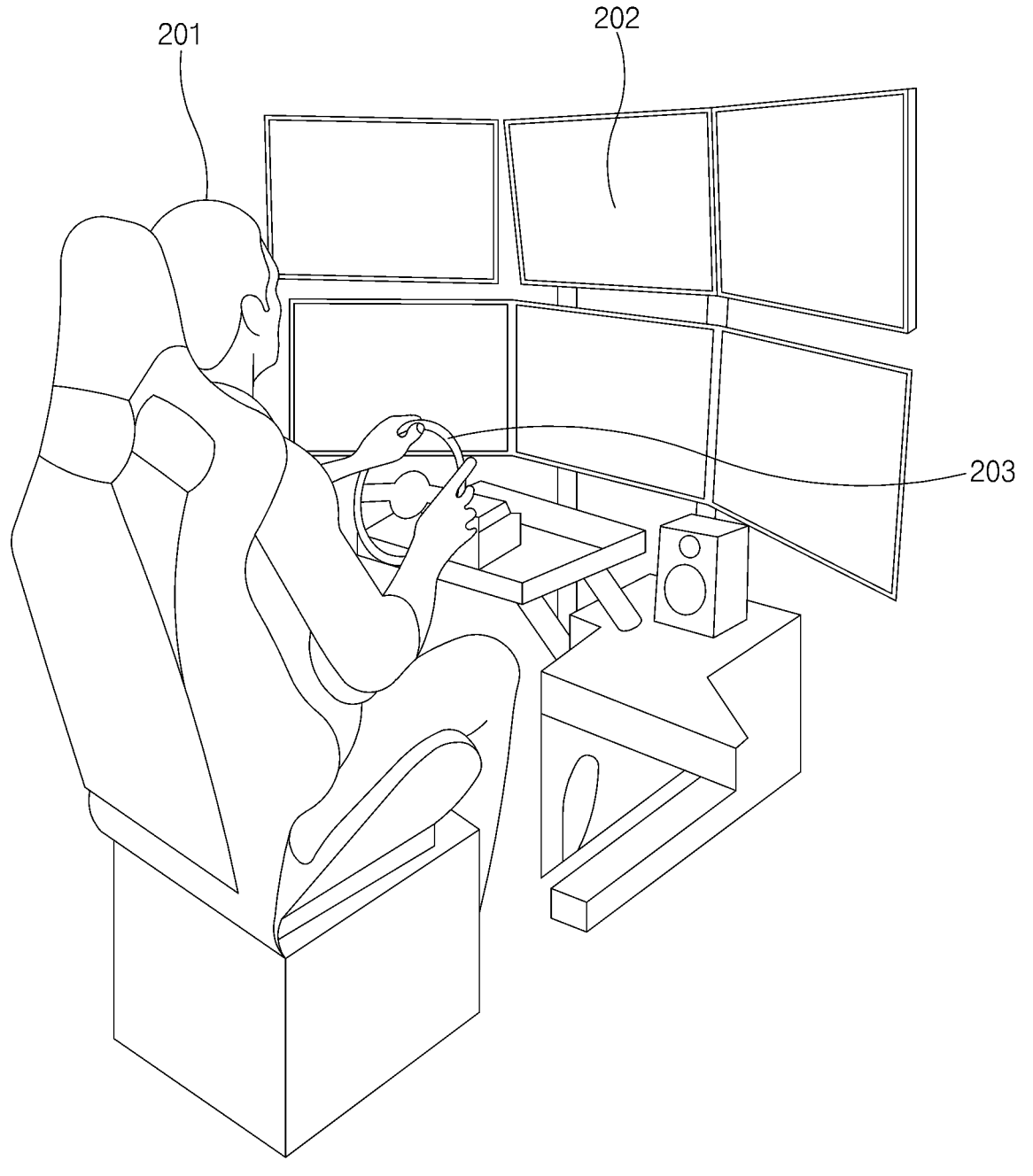
FIG. 2 illustrates a perspective view showing an example control system for remote control by a control manager.

FIG. 2 illustrates a perspective view showing an example control system for remote control by a control manager. The control system may be a remote control system capable of controlling an autonomous vehicle remotely.

Referring to FIG. 2, the control manager 201 (e.g., a remote driver) may check information such as a steering direction and a steering angle through a plurality of displays 202, and may adjust a steering 203 (e.g., a steering input device) to transmit a remote steering control command to the autonomous vehicle 100.

The displays 202 may display a current steering angle of the steering 203. Furthermore, the color of the steering 203 may be changed depending on a change in the steering angle.

Figure 3:
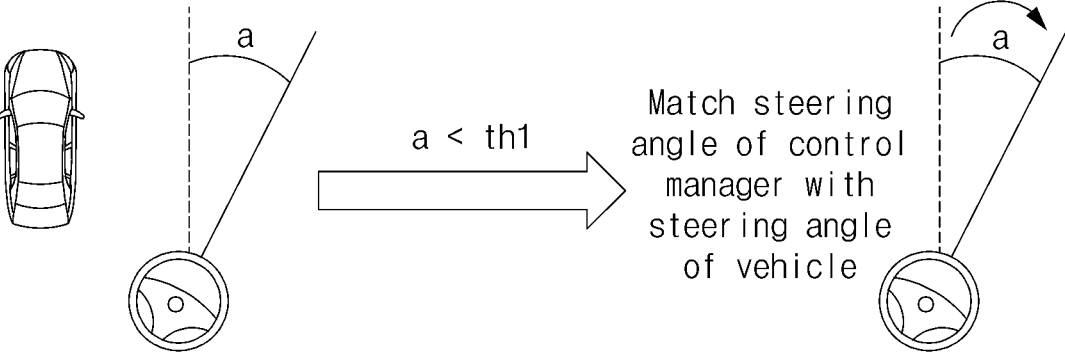
FIG. 3 illustrates a view for describing an example of adjusting a steering angle of a control manager when a current steering angle of a vehicle is less than a predetermined reference value.
Figure 4:
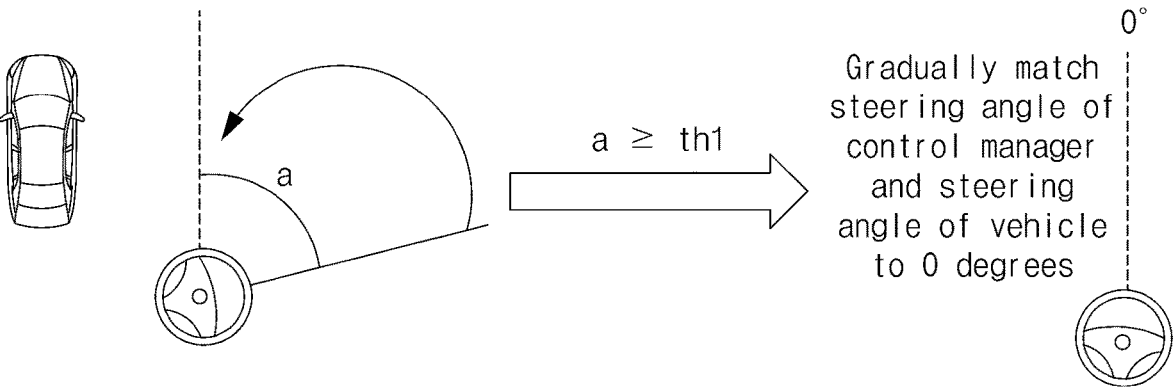
FIG. 4 illustrates a view for describing an example of adjusting a steering angle of a control manager when a current steering angle of a vehicle is equal to or greater than a predetermined reference value.

FIG. 3 illustrates a view for describing an example of adjusting a steering angle of a control manager if a current steering angle of a vehicle is less than a predetermined reference value, and FIG. 4 illustrates a view for describing an example of adjusting a steering angle of a control manager if a current steering angle of a vehicle is equal to or greater than a predetermined reference value.

Referring to FIG. 3, if a current steering angle "a" of the vehicle is less than a predetermined reference value th1, the control system 200 may match a steering angle of a steering 215 by the control manager 201 with a steering angle of the autonomous vehicle 100. For example, the predetermined reference value th1 may be 20 degrees. In the instant case, the steering angle of the control manager may indicate the steering angle of the steering 215 of the control system 200.

Referring to FIG. 4, if the current steering angle "a" of the vehicle is greater than or equal to the predetermined reference value th1, the control system 200 may match both the steering angle of the steering 215 by the control manager 201 and the steering angle of the autonomous vehicle 100 to 0 degrees. Then, the control system 200 may adjust the steering angle of the steering 215 to 0 degrees, and may request the autonomous vehicle 100 to set the steering angle of the autonomous vehicle 100 to 0 degrees.

Figure 5:
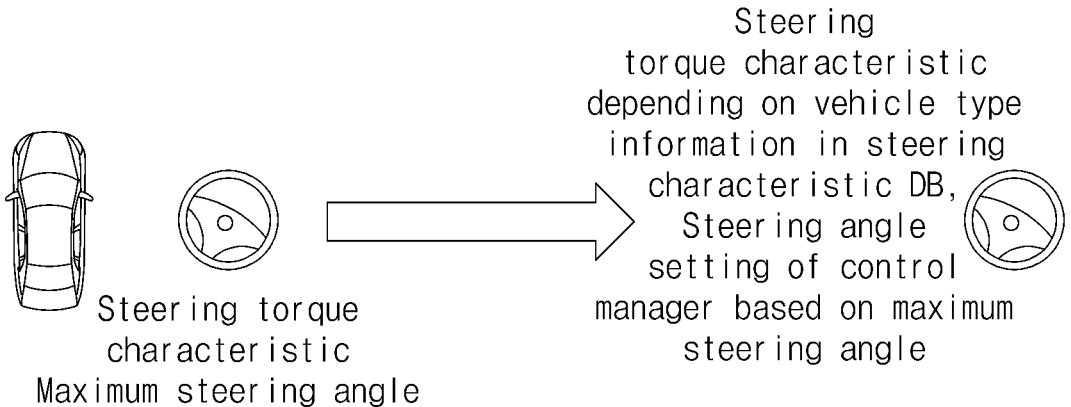
FIG. 5 illustrates a view for describing an example of setting a steering angle of a control system based on a steering characteristic database.

FIG. 5 illustrates a view for describing an example of setting a steering angle of a control system based on a steering characteristic database.

Referring to FIG. 5, a steering torque characteristic and a maximum steering angle of the steering 215 may be set depending on steering characteristic information for each vehicle type (e.g., a steering torque characteristic, a maximum steering angle information, etc.) stored in the steering characteristic database (DB).

Figure 6:
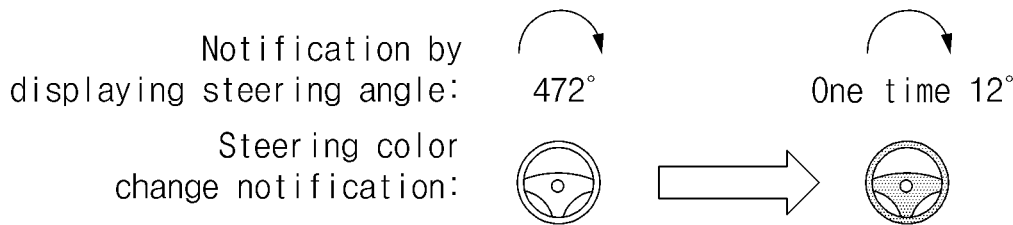
FIG. 6 illustrates an example of notifying a steering state to a control system.

FIG. 6 illustrates an example of notifying a steering state to a control system.

Referring to FIG. 6, the control system 200 may display a current steering angle and a steering direction of the steering 215 on the display, if the steering angle is less than a predetermined reference value, may indicate a color of the steering 215 as a first color (e.g., black), if a current steering angle of the steering 215 is rotated more than a predetermined reference value, may show a number of turns and the current angle and steering direction on the display, and may change the color of the steering 215 as a second color (e.g., red). To this end, an LED, etc. may be provided on a surface of the steering 215. Furthermore, a steering icon and photo may be displayed in different colors depending on a steering angle by displaying the steering icon and the photo on the display.

Furthermore, the control system 200 may output a change in the current steering angle of the steering 215 as a voice notification, and may output a warning sound when the autonomous vehicle 100 starts so that the control manager may recognize it. Furthermore, the control system 200 may perform a phrase or voice output requesting an acceleration limit in order to prevent the autonomous vehicle 100 from suddenly starting in a state in which the steering angles of the steering 215 and the autonomous vehicle 100 are rotated a lot.

For example, if the steering angle of the autonomous vehicle 100 is 180 degrees or more, steering of the autonomous vehicle 100 rotates two and a half turns (860 degrees), so the control manager may display a number of rotations on the display when the steering 215 rotates one or more turns.

Furthermore, if the steering angle of the autonomous vehicle 100 is 180 degrees or more when the autonomous vehicle 100 starts, the control system 200 may blink a steering angle screen before it starts and output a notification sound so that the control manager may recognize it. It is possible to prevent an accident due to the starting if the steering angle of the autonomous vehicle 100 is 180 degrees or more by starting the vehicle slowly so that, for example, a time to reach 2 km/h is 5 seconds at an initial vehicle starting, regardless of an accelerator pedal trajectory by the control manager.

As such, according to the present disclosure, an error in the steering angle may be minimized by preventing accidents that can occur when the control manager misrecognizes the steering angle of the steering and synchronizing the steering of the autonomous vehicle 100 and the steering 215 of the control system 200 based on the steering torque characteristic and the maximum steering angle for each vehicle type, thereby preventing an erroneous operation of vehicle control due to the error in the steering angle.

Figure 7A:
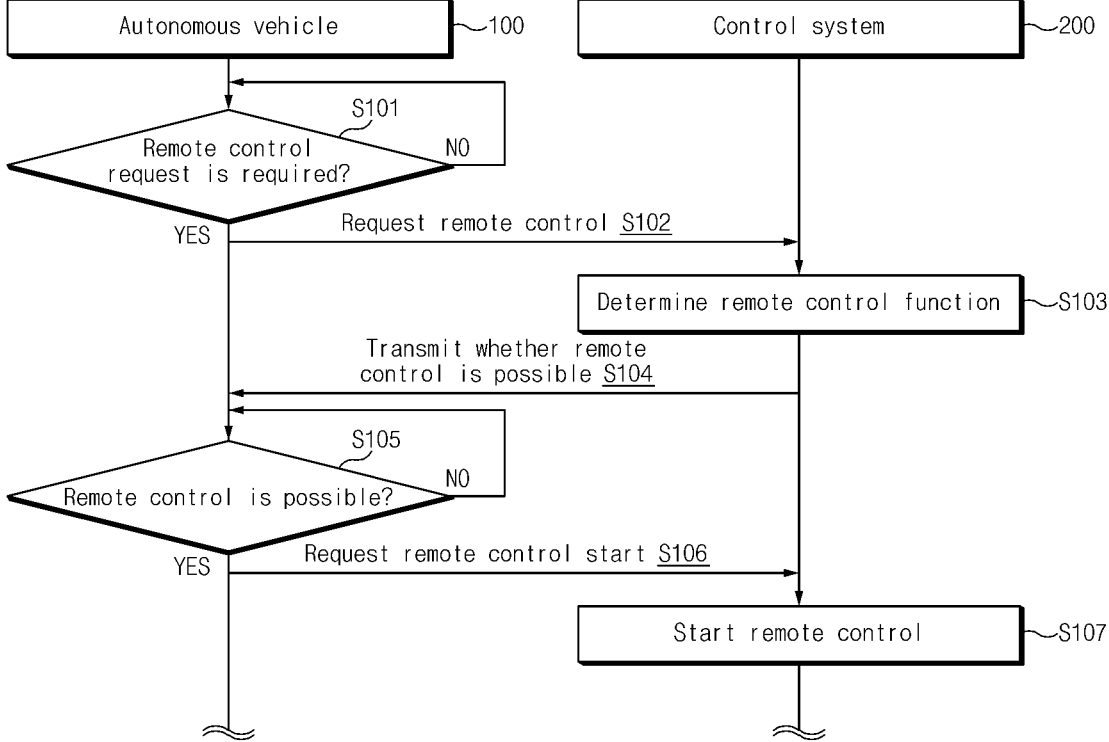
FIG. 7A and FIG. 7B illustrate a flowchart showing an example remote control method for an autonomous vehicle.
Figure 7B:
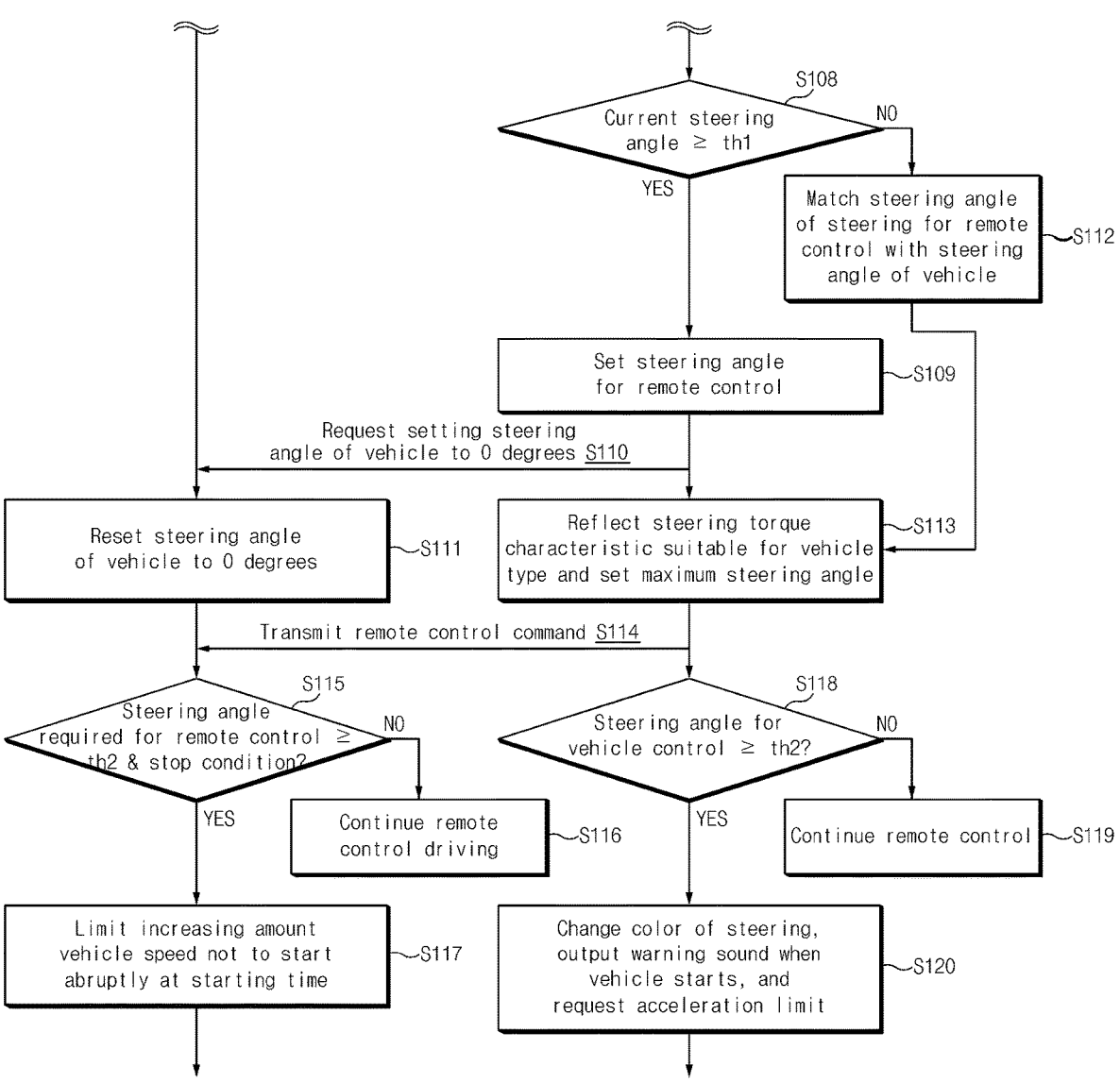

Hereinafter, a remote control method for an autonomous vehicle will be described in detail with reference to FIG. 7A and FIG. 7B. FIG. 7A and FIG. 7B illustrate a flowchart showing an example remote control method for an autonomous vehicle.

Hereinafter, it is assumed that the autonomous driving control apparatus 110 of the autonomous vehicle 100 of FIG. 1 and the control system 200 perform processes of FIG. 7A and FIG. 7B. Furthermore, in the description of FIG. 7A and FIG. 7B, it may be understood that operations described as being performed by each system are controlled by a processor of each of the systems.

Referring to FIG. 7A and FIG. 7B, the autonomous vehicle 100 may determine whether driving of a current path is difficult or impossible due to an external environment during autonomous driving, and if the driving on the current path is impossible (e.g., difficult), the autonomous vehicle 100 may determine that a remote control request is required (S101). Then, the autonomous vehicle 100 requests the control system 200 to perform remote control (S102).

Then, the control system 200 may determine whether the remote control is possible based on a vehicle path and vehicle surrounding information received from the autonomous vehicle 100 (S103), and transmit whether the remote control is possible to the autonomous vehicle 100 (S104).

Then, the autonomous vehicle 100 may determine whether an indication that remote control is possible or an indication that remote control is impossible has been received by the control system 200 (S105). If an indication that remote control is possible has been received, the autonomous vehicle 100 may request the control system 200 to perform the remote control (S106). In the instant case, the autonomous vehicle 100 may transmit steering angle information of the autonomous vehicle 100 when a remote control request is made to the control system 200.

The control system 200 may start the remote control (S107). In the instant case, the control system 200 may transmit a remote control command to a vehicle so as to avoid an obstacle on a path in a situation in which autonomous driving of the autonomous vehicle 100 is impossible, e.g., if there is the obstacle on the path. In the instant case, the remote control command may include a right turn command, a left turn command, a steering angle, a straight forward command, and the like.

The control system 200 may determine whether a current steering angle of the autonomous vehicle 100 is greater than or equal to a predetermined reference value th1 for the remote control (S108). The predetermined reference value th1 may be predetermined according to an experimental value (e.g., an optimal value determined through experimentation), and may be, e.g., 20 degrees.

If the current steering angle of the autonomous vehicle 100 is greater than or equal to the predetermined reference value th1, the control system 200 may set the steering angle of the steering 215 of the control system 200 for remote control to 0 degrees (S109). That is, if the current steering angle of the autonomous vehicle 100 is too large, a gap between the steering angle of the autonomous vehicle 100 and the steering angle of the steering 215 of the control system 200 may be too large, and thus an error may occur when adjusting the steering 215 to match the steering angle of the steering 215 of the control system 200 to the steering angle of the autonomous vehicle 100, and the control system 200 may set both the steering angle of the autonomous vehicle 100 and the steering angle of the steering 215 of the control system 200 to 0 degrees.

The control system 200 may request the autonomous vehicle 100 to set the current steering angle of the vehicle to 0 degrees (S110).

The autonomous vehicle 100 may reset the steering angle of the vehicle to 0 degrees (S111).

If the current steering angle of the autonomous vehicle 100 is less than the predetermined reference value th1 in step S108, the control system 200 may match the steering angle of the steering 215 for remote control with the steering angle of the autonomous vehicle 100.

For example, if the steering angle of the autonomous vehicle 100 is 16 degrees, the control system 200 may set the steering angle of the steering 215 for remote control to 16 degrees.

The control system 200 may reflect the steering torque characteristic that is suitable for the vehicle type based on the steering characteristic database DB, and set the maximum steering angle (S113).

In the instant case, the maximum steering angle of steering may be a maximum angle at which the steering can be rotated, and may vary depending on a vehicle type. Furthermore, the steering torque characteristic, which is a steering force, may include a speed characteristic at which the steering rotates.

The control system 200 may transmit a remote control command for steering control to the autonomous vehicle 100. In the instant case, the remote control command may include a steering direction and a steering angle.

The autonomous vehicle 100 may determine whether the steering angle requested for remote control from the control system 200 is greater than or equal to a predetermined reference value th2 and the autonomous vehicle 100 is in a stopped state (S115). The predetermined reference value th2 may be preset by an experimental value, and may be, e.g., 180 degrees.

If the steering angle requested for remote control from the control system 200 is less than the predetermined reference value th2 and the autonomous vehicle 100 is not in a stopped state, the autonomous vehicle 100 may continue remote control driving (S116).

If the steering angle requested for remote control from the control system 200 is greater than or equal to the predetermined reference value th2 and the autonomous vehicle 100 is in the stopped state, the autonomous vehicle 100 may start driving in a stopped state, and in the instant case, limit an increasing amount in vehicle speed so as not to start abruptly at a starting time (S117). For example, the autonomous vehicle 100 may limit an arrival time to 5 seconds when starting at 2 km/h.

The control system 200 may determine whether the steering angle for vehicle control is greater than or equal to the predetermined reference value th2 after steering characteristic information is reflected as in step S113 (S118).

If the steering angle for vehicle control is less than the predetermined reference value th2, the control system 200 may continue the remote control (S119). If the steering angle for vehicle control (e.g., remote control) is greater than or equal to the predetermined reference value th2, the system may change a color of the steering 215, output a warning sound when the autonomous driving vehicle 100 starts, or request the acceleration limit by displaying the steering angle of the steering 215 on a screen (S120).

When remotely controlling an autonomous vehicle, by synchronizing the steering angle of the autonomous vehicle and the steering angle of the control system, it may be possible to prevent erroneous operation due to mismatch between the steering angle of the autonomous vehicle and the steering angle of the control system, thereby preventing accidents from occurring.

Furthermore, it may be possible to prevent accidents caused by sudden acceleration in a state where the steering is misaligned by limiting an acceleration amount when an initial autonomous vehicle starts.

Figure 8:
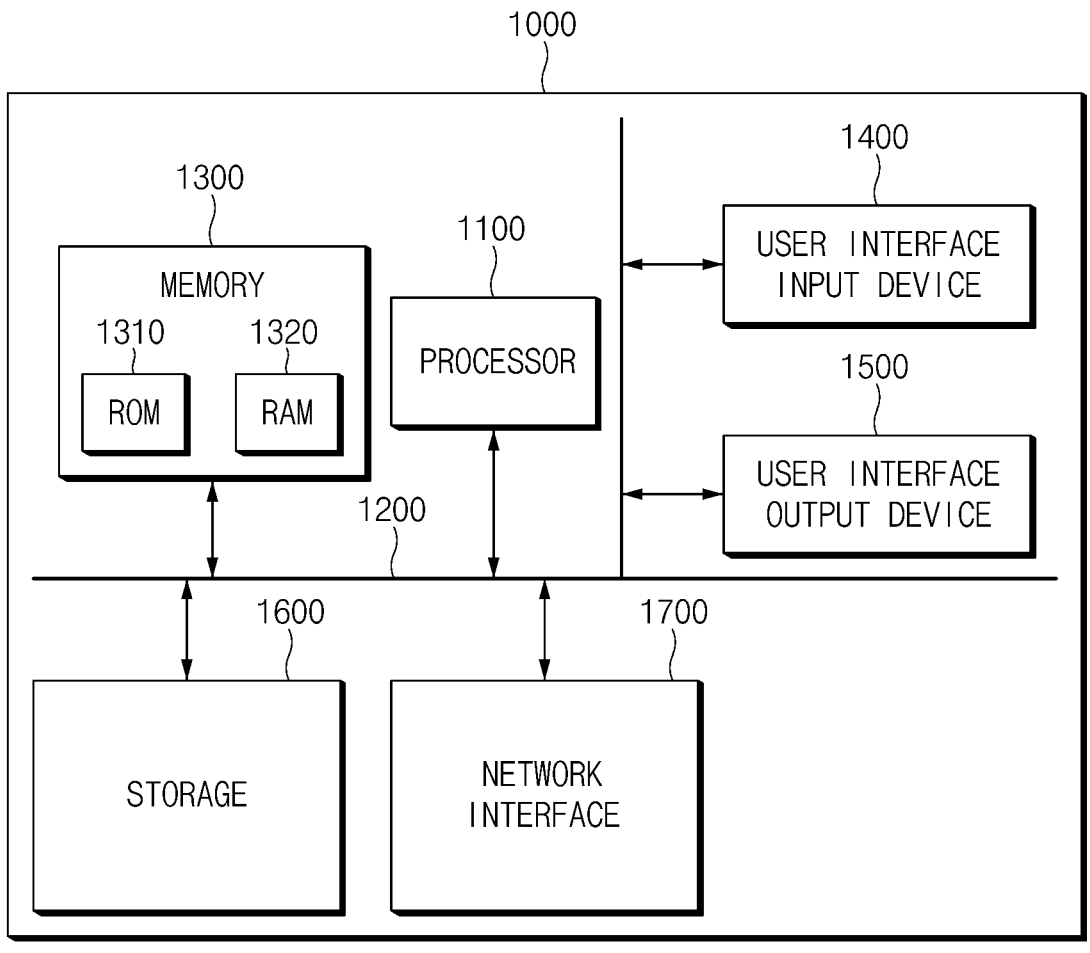
FIG. 8 illustrates an example computing system.

FIG. 8 illustrates an example computing system.

Referring to FIG. 8, a computing system 1000 may include at least one processor 1100 connected, through a bus 1200, to a memory 1300, a user interface input device 1400, a user interface output device 1500, a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read-only memory (ROM) 1310 and a random-access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (e.g., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium may be coupled to the processor 1100, which can read information from and write information to the storage medium. Alternatively, the storage medium may be integrated with the processor 1100. The processor and the storage medium may reside within an application-specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A control system comprising:
   a steering input device configured to be controlled by a user for steering control of an autonomous vehicle; and
   a processor configured to:
      receive, from the autonomous vehicle, a remote control request comprising an indication of a current steering angle of the autonomous vehicle; and
      synchronize, based on the indication, a steering angle of the autonomous vehicle with a steering angle of the steering input device,
      wherein the control system is an external remote control system that is located separately from the autonomous vehicle, and
      wherein the processor is configured to synchronize the steering angle of the autonomous vehicle with the steering angle of the steering input device by matching the steering angle of the steering input device with the current steering angle of the autonomous vehicle in response to the current steering angle of the autonomous vehicle being less than a predetermined reference value.

2. The control system of claim 1, further comprising
   a transceiver configured to receive the remote control request that is sent via a wireless transceiver of the autonomous vehicle; and
   a storage configured to store steering characteristic information including:
      a steering torque characteristic for each vehicle type of one or more vehicle types, and
      a maximum steering angle for each vehicle type of the one or more vehicle types.

3. The control system of claim 2, wherein the processor is further configured to apply a steering torque characteristic and a maximum steering angle, corresponding to a vehicle type of the autonomous vehicle, to a steering setting of the steering input device based on the stored steering characteristic information.

4. The control system of claim 3, wherein the processor is further configured to
   set, for the steering input device, the steering torque characteristic and the maximum steering angle corresponding to the vehicle type of the autonomous vehicle;
   transmit a remote control command to the autonomous vehicle for steering control of the autonomous vehicle; and
   determine whether a steering angle of the remote control command is greater than or equal to a second predetermined reference value.

5. The control system of claim 4, wherein the processor is further configured to continue to perform remote control of the autonomous vehicle in response to the steering angle of the remote control command being less than the second predetermined reference value.

6. The control system of claim 1, wherein the processor is further configured to, in response to the current steering angle of the autonomous vehicle being greater than or equal to the predetermined reference value, set the steering angle of the steering input device to 0 degrees, and transmit a command signal to the autonomous vehicle to set the steering angle of the autonomous vehicle to 0 degrees.

7. The control system of claim 1, wherein the processor is further configured to, in response to the steering angle of the autonomous vehicle for remote control being greater than or equal to the predetermined reference value, change a color of a portion of the steering input device.

8. The control system of claim 1, further comprising:
   a display configured to display at least one of the steering angle of the steering input device, a number of rotations of the steering input device, or a rotating direction of the steering input device.

9. The control system of claim 1, wherein the processor is further configured to, in response to the steering angle of the autonomous vehicle for remote control being greater than or equal to the predetermined reference value, output a warning sound at a time the autonomous vehicle starts.

10. The control system of claim 1, wherein the processor is further configured to, in response to the steering angle of the autonomous vehicle for remote control being greater than or equal to the predetermined reference value, request an acceleration limit of the autonomous vehicle.

11. The control system of claim 1, wherein the steering input device of the control system comprises a steering wheel and a light-emitting diode (LED) capable of color change,
   wherein the current steering angle indicates a current steering position of a steering wheel of the autonomous vehicle is different from a default steering position of the steering wheel of the autonomous vehicle,
   wherein the processor is configured to synchronize the steering angle of the autonomous vehicle with the steering angle of the steering input device by adjusting the steering angle of the steering wheel of the control system from a default steering position of the steering wheel of the control system, and
   wherein directions of a plurality of wheels of the autonomous vehicle are synchronized with the steering angle of the autonomous vehicle.

12. The control system of claim 1, wherein the processor is further configured to:
   in response to the current steering angle of the autonomous vehicle for remote control being less than the predetermined reference value, select a first synchronization scheme; and
   in response to the current steering angle of the autonomous vehicle for remote control being greater than or equal to the predetermined reference value, select a second synchronization scheme different from the first synchronization scheme.

13. An autonomous vehicle comprising:
   a wireless transceiver configured to wirelessly communicate with a control system; and
   a processor configured to:
      request the control system to perform remote control of the autonomous vehicle;
      receive, from the control system, a steering angle control command comprising an indication of a steering angle of the control system; and
      control a steering angle of the autonomous vehicle to synchronize the steering angle of the autonomous vehicle with the steering angle of the control system,
      wherein the control system is an external remote control system that is located separately from the autonomous vehicle, and
      wherein the processor is further configured to perform steering control of the autonomous vehicle based on the steering angle control command, in response to the steering angle of the control system being less than a predetermined reference value and the autonomous vehicle being in a driving state.

14. The autonomous vehicle of claim 13, wherein the wireless transceiver is configured to transmit a remote control request to cause the control system to perform remote control of the autonomous vehicle.

15. The autonomous vehicle of claim 14, wherein the processor is further configured to limit acceleration of the autonomous vehicle in response to the steering angle of the control system being greater than or equal to the predetermined reference value at a time the autonomous vehicle starts from a stopped state.

16. The autonomous vehicle of claim 14, wherein the processor is further configured to, in response to the steering angle of the control system being greater than or equal to the predetermined reference value and the autonomous vehicle being in a stopped state, control the autonomous vehicle to start at a vehicle speed that is less than a predetermined reference value regardless of an acceleration command received from the control system.

17. The autonomous vehicle of claim 13, wherein the processor is further configured to transmit to the control system via the wireless transceiver:

a current steering angle of the autonomous vehicle; and a request to perform the remote control of the autonomous vehicle.

18. A method performed by a control system, the method comprising:

receiving, by the control system, a remote control request from an autonomous vehicle;

receiving, by the control system, an indication of a current steering angle of the autonomous vehicle; and synchronizing, by the control system and based on the indication, a steering angle of the autonomous vehicle with a steering angle of the control system, wherein the control system is an external remote control system that is located separately from the autonomous vehicle, and wherein the synchronizing comprises:

matching, by the control system, the steering angle of the control system with the current steering angle of the autonomous vehicle in response to the current steering angle of the autonomous vehicle being less than a predetermined reference value.

19. The method of claim 18, further comprising:

applying, by the control system, a steering torque characteristic and a maximum steering angle, corresponding to a vehicle type of the autonomous vehicle, to a steering setting of the control system based on previously stored steering characteristic information for one or more vehicle types.

20. The method of claim 19, wherein the synchronizing comprises:

in response to the current steering angle of the autonomous vehicle being greater than or equal to the predetermined reference value:

setting, by the control system, the steering angle of the control system to 0 degrees; and transmitting a command signal to the autonomous vehicle to set the steering angle of the autonomous vehicle to 0 degrees.

* * * * *